United States Patent

Kaino

[15] 3,639,675
[45] Feb. 1, 1972

[54] LAMINATED GLASS STEM AND METHOD OF MAKING SAME

[72] Inventor: Yoku Kaino, Kodaira-shi, Japan
[73] Assignee: Hitachi, Ltd., Tokyo, Japan
[22] Filed: Sept. 24, 1969
[21] Appl. No.: 860,513

[30] Foreign Application Priority Data

Jan. 27, 1969 Japan.....................................44/5254
Oct. 2, 1968 Japan...................................43/71107

[52] U.S. Cl..................................174/50.61, 65/36, 65/59, 174/50.56
[51] Int. Cl...........................................................H01j 5/00
[58] Field of Search..................65/59, 36; 174/50.51, 50.56, 174/50.61, 152.4

[56] References Cited

UNITED STATES PATENTS 3,351,700  11/1967  Savolainen et al..................174/50.56

FOREIGN PATENTS OR APPLICATIONS 749,540  12/1966  Canada...............................174/152.4

Primary Examiner—Arthur D. Kellogg
Assistant Examiner—Robert L. Lindsay, Jr.
Attorney—Craig, Antonelli and Hill

[57] ABSTRACT

A stem having a metal cylinder, at least one metal lead extending through the cylinder, a glass body interposed between the cylinder and the lead for supporting the lead, electrically insulated from the cylinder, and a glass layer having a surface of greater resistivity than that of the glass body and covering at least a portion of the surface of the glass body so as to prevent a reduction of insulation resistance between the lead and the cylinder.

10 Claims, 7 Drawing Figures

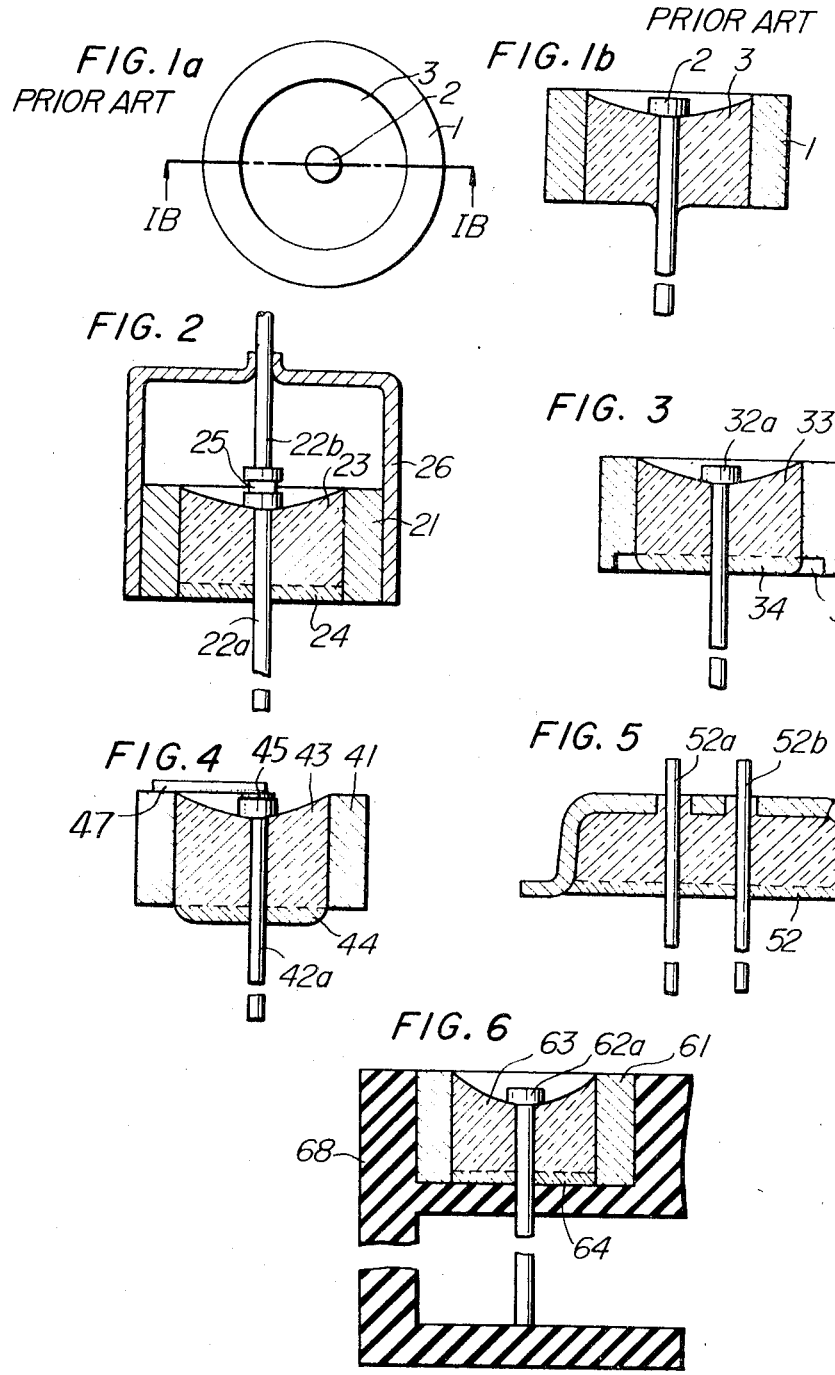

LAMINATED GLASS STEM AND METHOD OF MAKING SAME

This invention relates to methods of making stems for use in electronic devices such as semiconductor devices and more particularly to a method of making a laminated glass stem for use in such devices.

In electronic devices such as semiconductor devices, a structure called a stem is generally used to constitute a hermetically sealed fluidtight capsule and to receive therein a semiconductor element. A typical stem heretofore employed for this purpose comprised a metal ring or cylinder, one or a plurality of leads extending through the ring or cylinder, and a glass body commonly of soda lime glass interposed between the metal ring or cylinder and the leads. The soda lime glass in such a stem has been considered to make a very good intimate contact with the ring and leads, has a coefficient of thermal expansion substantially equivalent to those of the ring and leads, and provides a sufficient insulation resistance between the ring and the leads when the ring and leads are made of iron or an iron-nickel alloy.

However, it has been clarified that, when the stem is used for an extended period of time in an atmosphere of high temperature and high humidity, ionic matters including sodium ions ($Na^+$) adhere on the glass surface and combine to form conductive matter with external moisture thereby to reduce the insulation resistance between the leads and/or between the leads and the ring or to increase the leakage current. As a means for overcoming the above defect, it is thought to employ borosilicate glass known as Kovar sealing glass which contains sodium oxide ($Na_2O$) in a very small amount. However, the coefficient of thermal expansion of the Kovar glass is about half that of the soda lime glass and differs from that of iron or iron-nickel alloy. Thus, the Kovar glass cannot be used with iron or its alloy from the viewpoint of maintenance of reliability of the electronic device. Further, employment of iron-nickel-cobalt alloy sold under the trade name Kovar as a material for the ring and leads, especially as a material of the ring in order to attain a coincidence in the coefficients of thermal expansion entails a very high cost, and the use of a stem made thereof in a capsule of the cold sealing type is disadvantageous in view of the high cost involved. Moreover, due to the fact that Kovar when used as a material of the lead reduces the degree of dissipation of heat from an electronic element mounted thereon, it is undesirable to constitute the stem from Kovar glass for this reason also.

SUMMARY OF THE INVENTION

It is an object of the present invention to provide an improved stem in which the insulation resistance between a plurality of leads as well as between the leads and a metal ring would not be deteriorated due to a change in environmental conditions.

Another object of the present invention is to provide a highly fluidtight capsule which ensures the reliability of an electronic element contained therein.

A further object of the present invention is to provide a novel laminated glass stem of high mechanical strength.

Another object of the present invention is to provide a novel method of making a laminated glass stem of the kind described above in which the disadvantage brought about by bubbles evolving during the manufacturing process of the stem is completely eliminated.

A further object of the present invention is to provide a method of making a laminated glass stem in which the glass would not excessively rise along the lead by wetting the same.

In accordance with one embodiment of the present invention, there is provided a stem for an electronic device or more especially a stem for a semiconductor device which comprises a metal cylinder, one or a plurality of metal leads extending through said cylinder, a body of glass, e.g., soda lime glass interposed between said cylinder and said leads for electrically insulating said leads from the inner wall of said cylinder and supporting said leads in spaced relation from the inner wall of said cylinder, a cap member engaging the outer periphery of said cylinder, and a layer of glass, e.g., Kovar glass covering at least a portion of the surface of said glass body in order to prevent any reduction in the insulation resistance between said leads as well as between said leads and said cylinder, said glass layer having a volume resistivity and a surface resistivity greater than those of said glass body.

In accordance with another embodiment of the present invention, there is provided a method of making advantageously a stem as described above which comprises preparing a layer of glass having a relatively high first working point (a temperature at which a viscosity of $10^4$ poises is reached), placing a block of glass having a relatively low second working point on said glass layer, and heating the combination so obtained at a temperature in the vicinity of the first working point thereby bonding said glass block and said glass layer to each other while letting bubbles evolved in said glass block escape into the air.

The above and other objects, features and advantages of the present invention will be readily apparent from the following detailed description taken in conjunction with the accompanying drawings.

BRIEF DESCRIPTION OF THE DRAWINGS

FIG. 1a is a top plan view or a prior art stem.

FIG. 1b is a sectional view taken on the line $I_B$—$I_B$ in FIG. 1a.

FIGS. 2 through 5 are sectional views of preferred embodiments of the stem according to the present invention.

FIG. 6 is a sectional view of a stem structure in one of the steps for the manufacture of the laminated glass stem embodying the present invention.

DESCRIPTION OF THE PREFERRED EMBODIMENTS

FIGS. 1a and 1b show a stem of conventionally known structure used for a silicon rectifier. The stem comprises a metal ring 1, a lead 2 and a glass body 3. Commonly, the metal ring 1 is made of iron or an iron-nickel alloy, the lead 2 is made of an iron-nickel alloy or iron, and the glass body 3 is made of soda lime glass. Although not shown therein, a silicon pellet is mounted on the head portion of the lead 2 and a metal cap is fitted on the metal ring 1 to establish a fluidtight space so as thus to hold the silicon pellet in a fixed atmosphere within the fluidtight space. External connection for one of the electrodes of the rectifier is provided by the above lead 2, while external connection for the other electrode of the rectifier is provided by another lead electrically connected with the metal cap and metal ring.

As previously described, the soda lime glass makes a very good intimate contact with the iron or iron-nickel alloy as they have a substantially the same coefficient of thermal expansion. Accordingly, an undesirable fluid such as moisture or gas can not permeate into the capsule through the interface between the ring 1 and the glass body 3 and through the interface between the glass body 3 and the lead 2 of the stem, and the desired fluidtightness is maintained in the stem so that the electrical property of the semiconductor device can stably be maintained to a satisfactory degree. However, the prior art stem has been defective in that, when it is exposed to an atmosphere of high temperature and high humidity for an extended period of time, the insulation resistance between the anode and the cathode, that is, between the lead 2 and the ring 1 is reduced to increase the reverse current of the rectifier.

In a rectifier designed for ordinary services, an insulation resistance of, for example, more than $1 \times 10^8$ ohms is required between the lead 2 and the ring 1, and this requirement is satisfied when the rectifier is operated in an atmosphere of room temperature and room humidity. But, the insulation resistance is reduced to about $1 \times 10^6$ to $1 \times 10^7$ ohms after it is operated for 1,000 hours in an atmosphere of high temperature, for example, 80° C. and under high humidity, for example, 90 percent.

The present invention contemplates to overcome the prior art defects described above and is featured by the fact that an elongated lead is disposed in a ring and a plurality of glass layers such as a soda lime glass layer and a Kovar glass layer are disposed in stacked relation within the ring so as to electrically insulate the lead from the inner wall of the ring and fix the lead in spaced relation from the inner wall of the ring.

Referring to FIG. 2 showing a rectifier embodying the present invention, the rectifier comprises a ring or cylinder 21 made of iron, a Kovar glass layer 24 and a soda lime glass layer 23 brought into intimate contact with the inner peripheral wall of the ring 21 by fusion, a first lead 22a of an iron-nickel alloy extending through the glass stack thus formed, a second lead 22b of an iron-nickel alloy holding a PN-junction element 25 between it and the first lead 22a, and a metal cap 26 in intimate contact with the outer peripheral face of the ring 21 and the second lead 22b to form a fluidtight space in cooperation with the stem consisting of the ring 21, the glass layers 23 and 24, and the lead 22a.

For the attainment of the objects of the present invention, it is of prime importance that proper selection of the glass materials should be carried out. In the case of the present embodiment, good results could be obtained by employing soda lime glass sold under the trade name Corning 0080 including 73.6% silica ($SiO_2$), 17.2% sodium oxide ($Na_2O$), 5.4% lime ($CaO$), 3.7% magnesia ($MgO$) and 1% alumina ($Al_2O_3$) as a material of the first glass layer 23, and employing borosilicate glass including 80% silica ($SiO_2$), 14% boron trioxide ($B_2O_3$), 4% sodium oxide ($Na_2O$) and 2% alumina ($Al_2O_3$) as a material of the second glass layer 24. The first glass material is selected chiefly from the viewpoint of whether it has a coefficient of thermal expansion conforming with those of the lead and ring and whether it shows a good wettability with respect to the lead and ring. On the other hand, the second glass material is selected from the viewpoint of whether it has a high-volume resistivity compared with that of the first glass material, whether its surface resistivity is free from reduction to a value lower than that of the first glass material under the operational environment expected for the stem, whether it does not contain especially harmful alkali metal elements in large amounts, and whether its working point is higher than that of the first glass material. A low alkali glass containing various alkaline components in a total amount of less than about 6 percent and a sodium oxide component in an amount of less than about 0.15 percent or an alkali-free glass containing various alkaline components in a total amount of less than about 0.56 percent and a sodium oxide component in an amount of less than about 0.05 percent is especially suitable for the second glass material. In order to obtain an insulation resistance of the order of $10^8$ ohms, a glass material may also be useful which contains various alkaline components such as sodium oxide, potassium oxide, lithium oxide, etc., in a total amount of less than about 10 percent and a sodium oxide component in an amount of less than about 5 percent.

In regard to the thickness of the soda lime glass layer 23 and Kovar glass layer 24, the former is desirably thicker than the latter for the maintenance of fluidtightness. For example, the ratio of the thickness of the former to the thickness of the latter is selected to be in the region of 4:1. Thus, the soda lime glass layer 23 makes a good fluidtight bond with the iron ring 21 and the iron-nickel lead 22a and has a coefficient of thermal expansion substantially equal to those of the ring 21 and lead 22a. Therefore, the stem exhibits a satisfactory fluidtightness comparable to that of the prior art stems. On the other hand, since the Kovar glass layer 24 having a high surface resistivity is disposed in the lower part of the stem, the insulation resistance between the ring 21 and the lead 22a is not reduced at all, even when the rectifier is operated in an atmosphere of high temperature and humidity. The insulation resistance between the lead 22a and the ring 21 of the stem in the present embodiment was maintained at a satisfactory value of the order of $10^{10}$ ohms when, for example, the rectifier was operated for 1,500 hours in an atmosphere at a temperature of 80° C. and a humidity of 90 percent. In the stem of FIG. 2, fluidtightness is maintained principally by the firm bond between the ring 21 and the glass layer 23. Although there is a difference between the coefficient of thermal expansion of the Kovar glass 24 and those of the iron ring 21 and iron-nickel lead 22a, such a difference would not in any way deteriorate the fluidtightness since the Kovar glass layer 24 is originally thin (for example, of the order of 0.5 mm. after it is compression molded from powder) and the Kovar glass is partly mixed with the soda lime glass after fusion to appear as a thinner layer.

Such a stem is obtained by use of, for example, a zig 68 of carbon as shown in FIG. 6. In making the stem, a ring 61 is placed at a predetermined position in the zig 68, and a Kovar glass block 64 and a soda lime glass block 63 are successively placed in the central space of the ring 61. Then, a lead 62a is passed through a central opening of the glass block 63 and through a central opening of the glass block 64. The zig 68 is also bored with an opening at a position corresponding to the openings of the glass blocks 63 and 64. The structure assembled in this manner is passed together with the zig 68 through a furnace to fuse the glass blocks. In this case, the structure is heated to a temperature which is sufficient to mold the Kovar glass, for example, at a temperature of 1,040° C. which is close to the working point of the Kovar glass. Since the soda lime glass has a working point of the order of 950° C., both the glass blocks are naturally in a fused state at the above temperature 1,040° C. and a part of the fused soda lime glass block 63 rises along the inner face of the ring 61 as seen in FIG. 6.

The glass blocks 63 and 64 are formed by compression molding of glass powders. Thus, when the glass blocks 63 and 64 are fused, bubbles of a size of 0.4 to 0.5 mm. in diameter comparable to the diameter of the lead 62a result from air which exists between the glass particles. Bubbles should be released in order to minimize the number of the bubbles remaining in the fused glass blocks. However, in the case of the process described above, the bubbles are conveniently quickly released in the air through the soda lime glass block 63 having a small viscosity since the Kovar glass block 64 is disposed beneath the soda lime glass block 63 and heat treatment is performed at a temperature corresponding to the high working point of the Kovar glass. Therefore, the glass stack after fusion treatment is substantially free from void pores and is compact throughout. As a result, the degree of intimate bonding between the glass stack and the lead or ring as well as the fluidtightness of the capsule can be improved, and the insulation resistance between the lead and the ring is prevented from undesirable reduction.

Further, according to the process shown in FIG. 6, the glass does not in any way rise along that portion of the lead which extends outwardly from the stem, and thus there is utterly no fear of cracks developing in the glass stack due to bending of the lead in either direction. It is therefore possible to obtain a mechanically strong stem.

Another embodiment shown in FIG. 3 comprises elements 31, 32a, 33 and 34 corresponding to the respective elements 21, 22a, 23 and 24 shown in FIG. 2. The ring 31 has an annular groove 37 formed in the lower face thereof. In this embodiment, the Kovar glass layer 34 contacts with the ring 31 with a very small area thereby obviating the problem arising from the difference between their coefficients of thermal expansion. Further, this embodiment has an extended surface leakage current path between the glass layer 34 and the ring 31. Accordingly, fluidtightness is improved more and prevention of the insulation resistance from lowering is ensured more than with the embodiment shown in FIG. 2. In an alternative arrangement, the glass layer 34 may extend to wholly or partly fill the groove 37.

In a further embodiment of the present invention shown in FIG. 4, elements 41, 42a, 43, 44 and 45 correspond to the respective elements 21, 22a, 23, 24 and 25 shown in FIG. 2. In this embodiment, the ring 41 is not grooved unlike the ring 31 shown in FIG. 3, and the lower portion of the ring 41 does not surround the glass layer 44. This embodiment is also advantageous in that fluidtightness is improved and the insulation resistance is prevented from being reduced. Moreover, in this embodiment, an electrode of the PN-junction element 45 is connected to the ring 41 by means of the connector 47, whereby the necessity for leading such a lead as lead 22b shown in FIG. 2 to the PN-junction element is avoided.

FIG. 5 shows another embodiment of the present invention when it is applied to a stem for a transistor. The stem comprises a cup-shaped member 51, leads 52a and 52b, a soda lime glass layer 53 and a Kovar glass layer 52. In this embodiment too, insulation resistance between the cup-shaped member 51 and the lead 52a or 52b is not reduced as far as the exposed portion of the soda lime glass layer 53 is concerned. It is desirable that a second glass be disposed to cover the two exposed principal surfaces of the first glass disposed within the cup-shaped member 51. However, in a conventional semiconductor device in which one of its principal surfaces is exposed to a dry atmosphere in a sealed capsule, the second glass may merely cover the other principal surface or may be disposed on at least a portion of the other principal surface so as to surround the leads.

In the foregoing description, the second glass is illustrated as though it defines a distinct boundary between it and the surface of the first glass, but actually the boundary between the first glass and the second glass cannot be distinctly be defined because the first glass intermixes with the second glass at the boundary portion.

The embodiments described above have referred mainly to the use of soda lime glass and borosilicate glass. However, it will be understood from consideration of the purport of the present invention that the present invention is in no way limited to such specific embodiments. For instance, the soda lime glass may be replaced by potash soda barium glass sold under the trade name of Corning 9010. The ring and lead may also be made of metals other than iron or its alloy as required.

What is claimed is:

1. A stem comprising an annular member of metal selected from the group consisting of iron and alloys containing iron as a principal ingredient, a lead of metal selected from the group consisting of iron and alloys containing iron essentially, said lead extending through said annular member, and a glass body disposed in the space between said annular member and said lead so as to make a firm bond with the inner wall of said annular member and the outer periphery of said lead, said glass body being in the form of a stack of a soda lime glass layer and a borosilicate glass layer containing alkaline components in a total amount of less than about 10 percent and sodium oxides in an amount of less than about 5 percent, said borosilicate glass layer having a thickness smaller, a volume and surface resistivity greater, and a working point higher than those of said soda lime glass layer, respectively.

2. A stem as claimed in claim 1, in which a cap member of metal is fitted on the outer peripheral wall of said annular member on the side at which said soda lime glass layer is exposed so as to enclose the exposed surface of said soda lime glass layer within a predetermined fluidtight space.

3. A capsule comprising an annular member of metal, at least one elongated lead of metal extending through said annular member, a glass body disposed in the space between said annular member and said lead so as to make a firm bond with the inner wall of said annular member and the outer periphery of said lead, a cap member engaging the outer peripheral wall of said annular member to define a fluidtight space adjacent to a portion of said lead and a portion of said glass body, and a glass layer covering the portion of said glass body which is exposed to air, said glass layer containing alkaline components in a total amount of less than about 10 percent and sodium oxides in an amount of less than about 5 percent and having a volume resistivity greater, a surface resistivity greater and a working point higher than those of said glass body.

4. A method of making a stem comprising the steps of preparing an annular member of metal, passing an elongated lead through said annular member, disposing a first glass block having a relatively high first working point and a relatively high-volume resistivity and surface resistivity at a position adjacent to the space defined between said lead and said annular member, said first glass block containing alkaline components in a total amount of less than about 10 percent and sodium oxides in an amount of less than about 5 percent, disposing a second glass block having a relatively low second working point and a relatively low volume resistivity and a surface resistivity on said first glass block and within said space, and maintaining the structure thus obtained at a temperature in the vicinity of said first working point for fusing both said glass blocks thereby to ensure a firm bond between said glass blocks and said annular member and said lead and to fix said lead in spaced relation from the inner wall of said annular member.

5. A method as claimed in claim 4, in which said first glass block is made of Kovar glass and said second glass block is made of soda lime glass.

6. A stem comprising an annular member of metal, at least one elongated conductive lead extending through said annular member, a glass body disposed in the space between and in intimate contact with said annular member and said lead, and a glass layer covering at least a portion of the surface of said glass body to prevent a reduction of insulation resistance between said lead and said annular member, said glass layer having a surface resistivity greater than that of said glass body and containing alkaline components in a total amount of less than about 10 percent and sodium oxides in an amount of less than about 5 percent.

7. The stem as claimed in claim 6 wherein said glass body is constructed of a material having a coefficient of thermal expansion substantially equivalent to those of said annular member and said lead and demonstrates a good wettability therewith.

8. The stem as claimed in claim 6 wherein said glass layer is a low alkali glass containing alkaline components in a total amount of less than about 6 percent and a sodium oxide component in an amount of less than about 0.15 percent.

9. The stem as claimed in claim 8 wherein said alkaline components are present in a total amount of less than about 0.56 percent and the sodium oxide component is present in an amount of less than about 0.05 percent.

10. The stem as claimed in claim 6 wherein contact between said annular member and said glass layer is minimized to obviate problems arising from differences in their coefficients of thermal expansion.

* * * * *